United States Patent
Schäfer (12)

(10) Patent No.: US 7,169,491 B2
(45) Date of Patent: Jan. 30, 2007

(54) FLEXIBLE SYSTEM FOR HYDROGEN RECIRCULATION

(75) Inventor: Robert Schäfer, Darmstadt (DE)

(73) Assignee: General Motors Corporation, Detroit, MI (US)

( * ) Notice: Subject to any disclaimer, the term of this patent is extended or adjusted under 35 U.S.C. 154(b) by 574 days.

(21) Appl. No.: 10/373,954

(22) Filed: Feb. 26, 2003

(65) Prior Publication Data

US 2004/0166383 A1 Aug. 26, 2004

(51) Int. Cl.
*H01M 8/04* (2006.01)

(52) U.S. Cl. .............................. 429/17; 429/13; 429/34

(58) Field of Classification Search ................. 429/13, 429/34, 17
See application file for complete search history.

(56) References Cited

U.S. PATENT DOCUMENTS

| | | | |
|---|---|---|---|
| 5,484,666 A | 1/1996 | Gibb et al. | |
| 5,547,777 A | 8/1996 | Richards | |
| 5,789,091 A | 8/1998 | Wozniczka et al. | |
| 6,040,072 A | 3/2000 | Murphy et al. | |
| 6,503,651 B1 * | 1/2003 | Nguyen | 429/34 |
| 6,670,067 B2 * | 12/2003 | Sato et al. | 429/34 |
| 2003/0054211 A1 * | 3/2003 | Charlat | 429/13 |
| 2004/0166384 A1 | 8/2004 | Schäfer | |

FOREIGN PATENT DOCUMENTS

| | | |
|---|---|---|
| EP | 0 444 383 A1 | 9/1991 |
| EP | 0 981 174 A2 | 2/2000 |
| EP | 0 981 175 A2 | 2/2000 |
| EP | 0 981 174 A3 | 7/2000 |
| EP | 0 981 175 A3 | 7/2000 |
| JP | 61-225779 | 10/1986 |
| JP | 8-88018 | 4/1996 |
| JP | 11-97054 | 4/1999 |
| WO | WO02/41426 * | 5/2002 |
| WO | WO 03/005472 A2 | 1/2003 |

* cited by examiner

*Primary Examiner*—Raymond Alejandro
*Assistant Examiner*—Tony Chuo
(74) *Attorney, Agent, or Firm*—Harness, Dickey & Pierce, P.L.C.

(57) ABSTRACT

A fuel cell system that routes anode effluent from one fuel cell stack to the anode side of another fuel cell stack to consume unused hydrogen in the production of electricity is disclosed. The routing of the anode effluent from one fuel cell stack to another is accomplished by providing flow paths that connect the anode sides of the various fuel cell stacks together. The flow paths contain valves that are operable to selectively block flow through the various flow paths as desired. Optionally, the flow paths can be operated free of any valves. Methods of operating such fuel cell systems are also disclosed.

27 Claims, 2 Drawing Sheets

FLEXIBLE SYSTEM FOR HYDROGEN RECIRCULATION

FIELD OF THE INVENTION

The present invention relates generally to fuel cell systems and more particularly to recirculation of anode effluent in a fuel cell system.

BACKGROUND OF THE INVENTION $H_2$—$O_2$(air) fuel cells are well known in the art and have been proposed as a power source for many applications. There are several types of $H_2$—$O_2$ fuel cells including acid-type, alkaline-type, molten-carbonate-type, and solid-oxide-type. So called PEM (proton exchange membrane) fuel cells (a.k.a. SPE (solid polymer electrolyte) fuel cells) are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack.

In PEM fuel cells hydrogen is the anode reactant (i.e., fuel) and oxygen is the cathode reactant (i.e., oxidant). The oxygen can either be in a pure form (i.e., $O_2$), or air (i.e., $O_2$ mixed with $N_2$). The solid polymer electrolytes are typically made from ion exchange resins such as perfluoronated sulfonic acid. The anode/cathode typically comprise finely divided catalytic particles (often supported on carbon particles) admixed with proton conductive resin.

During the conversion of the anode reactant and cathode reactant to electrical energy, the fuel cell, regardless of the type, produces anode and cathode effluents that are exhausted from the fuel cell stack. Because the anode reactant (hydrogen) is supplied in a surplus quantity (i.e., above the required stoichiometric amount) the anode effluent contains unused hydrogen that represents an unused source of energy. Similarly, the cathode reactant (oxygen) is also supplied in an excess amount and as a result the cathode effluent contains excess oxygen or air that was not consumed during the production of electricity in the fuel cell stack. The amounts of hydrogen and oxygen remaining in the anode and cathode effluents is dependent upon a number of factors and will vary. For example, the efficiency of the fuel cell can impact the amount of hydrogen and oxygen that are exhausted in the respective anode and cathode effluents. Additionally, the stoichiometric operation of the fuel cell stack (i.e., the amounts of hydrogen and oxygen that are included in the respective anode and cathode reactants) will also effect the amount of remaining hydrogen and oxygen in the respective anode and cathode effluents. The anode effluent exhausted by the fuel cell stack can be either continuous or intermittent, depending upon the desired operation of the fuel cell system within which the fuel cell stack is employed.

Because excess hydrogen is exhausted from the fuel cell stack in the anode effluent, it is beneficial to capture the energy contained in the excess hydrogen. One manner of utilizing the excess hydrogen is to recycle at least a portion of the anode effluent back through the anode side of this or another fuel cell stack. To accomplish this, prior art fuel cell systems use a pump to recirculate a portion of the anode effluent back through the anode side of the fuel cell stack. However, the pumps used for such purposes are expensive and add to the cost of a fuel cell system. Additionally, the pumps are relatively large and increase the required packaging space of the fuel cell system. Therefore, it would be desirable to be able to recirculate at least a portion of the anode effluent through a fuel cell stack in a simple and low cost manner. Furthermore, it is desirable to recycle at least a portion of the anode effluent with hardware that adds relatively little or no additional required packing space to a fuel cell system.

SUMMARY OF THE INVENTION

A fuel cell system according to the principles of the present invention and the methods disclosed herein provide for recycling of anode effluent exhausted by a fuel cell stack by routing at least a portion of the anode effluent through an anode side of another fuel cell stack. This is accomplished without the use of expensive and space consuming pumps.

A method of operating a fuel cell system having a plurality of fuel cell stacks each operable to convert a hydrogen-containing anode reactant on an anode side of the fuel cell stack and an oxidant-containing cathode reactant on a cathode side of the fuel cell stack into electricity, a hydrogen-containing anode effluent on the anode side and an oxidant-containing cathode effluent on the cathode side, wherein the anode side of each fuel cell stack is connected to the anode side of a different fuel cell stack with a flow path is disclosed. The method includes: (1) supplying a hydrogen-containing anode reactant stream to an anode side of at least one fuel cell stack of the plurality of fuel cell stacks for reaction therein and production of a first anode effluent stream; (2) supplying the first anode effluent stream to the anode side of at least one of the other fuel cell stacks of the plurality of fuel cell stacks via the flow paths for reaction therein and production of a second anode effluent stream; and (3) switching which fuel cell stack(s) that receive the anode reactant stream.

Additionally, a method of operating a fuel cell system having a plurality of fuel cell stacks each operable to convert a hydrogen-containing anode reactant on an anode side of the fuel cell stack and an oxidant-containing cathode reactant on a cathode side of the fuel cell stack into electricity, a hydrogen-containing anode effluent on the anode side and an oxidant-containing cathode effluent on the cathode side is also disclosed. The method includes: (1) supplying a hydrogen-containing anode reactant stream to the anode sides of each fuel cell stack in a first segment of the system for reaction therein to produce at least one first segment anode effluent stream, wherein the first segment comprises one or more fuel cell stacks of the plurality of fuel cell stacks; (2) supplying the at least one first segment anode effluent stream to the anode side of the fuel cell stacks in a second segment of the system for reaction therein to produce at least one second segment anode effluent stream, wherein the second segment comprises other fuel cell stacks of the plurality of fuel cell stacks; and (3) changing a selection of said one or more fuel cell stacks that comprise the first segment.

A fuel cell system according to the principles of the present invention is disclosed. The fuel cell system includes a plurality of fuel cell stacks each having an anode side with an inlet portion and an outlet portion and a cathode side with an inlet portion and an outlet portion. Each fuel cell stack is operable to convert a hydrogen-containing anode reactant feed stream and an oxidant-containing cathode reactant feed stream into electricity, and to produce a hydrogen-containing anode effluent and an oxidant-containing cathode effluent. There are a plurality of flow paths that each connect the anode inlet portion of one of the fuel cell stacks to the anode outlet portion of a different one of the fuel cell stacks. At least one vent valve communicates with the anode outlet portion of at least one the fuel cell stacks and is operable to selectively vent the anode effluent.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
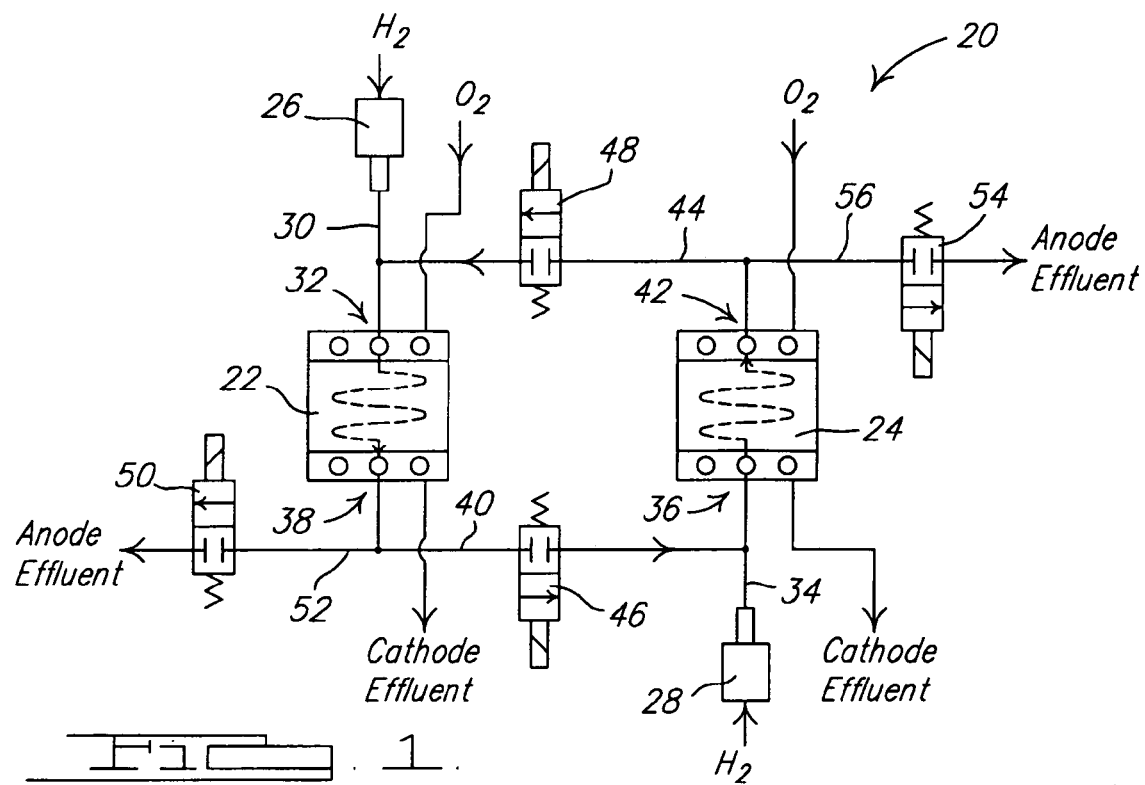
FIG. 1 is a schematic representation of a first preferred embodiment of a fuel cell system according to the principle of the present invention.

Referring to FIG. 1, a first preferred embodiment of a fuel cell system 20 according to the principles of the present invention is shown. Fuel cell system 20 includes first and second fuel cell stacks 22 and 24 that each have an anode side and a cathode side for receiving respective hydrogen-containing anode reactant and oxygen-containing cathode reactant. Each fuel cell stack 22 and 24 is operable to convert the anode and cathode reactants into electricity, a hydrogen-containing anode effluent and an oxygen-containing cathode effluent.

The hydrogen-containing anode reactant can be provided from a variety of sources. Such sources include, but are not limited to, a reformate stream from a reformer and hydrogen from a hydrogen storage device. The cathode reactant can also be provided from a variety of sources. Such sources include, but are not limited to, oxygen supplied from an oxygen storage device and air drawn from the environment within which the fuel system 20 is employed. The cathode reactant supply to the fuel cell stacks and the venting of cathode effluent produced in the fuel cell stacks will not be discussed in detail. It should be understood that cathode reactant will be supplied to the various fuel cell stacks in a quantity sufficient to meet the operational demands of fuel cell system 20 and that cathode effluent will be removed from fuel cell system 20 as needed.

First and second anode supply devices 26 and 28, in this case in the form of gas injectors, supply anode reactant to the anode sides of the respective first and second fuel cell stacks 22 and 24. First injector 26 supplies the anode reactant to first fuel cell stack 22 via flow path 30 which is connected to an anode inlet portion 32 of first fuel cell stack 22. Second gas injector 28 supplies anode reactant to second fuel cell stack 24 via flow path 34 which is connected to an anode inlet portion 36 of second fuel cell stack 24. An anode outlet portion 38 of first fuel cell stack 22 is connected to anode inlet portion 36 of second fuel cell stack 24 with flow path 40. An anode outlet portion 42 of second fuel cell stack 24 is connected to anode inlet portion 32 of first fuel cell stack 22 with flow path 44. Valves 46 and 48 are positioned in the respective flow paths 40 and 44. Valves 46 and 48 are operable to selectively prevent flow through the respective flow paths 40 and 44. Flow path 40 in conjunction with valve 46 are operable to selectively allow anode effluent from first fuel cell stack 22 to flow to the anode side of second fuel cell stack 24. Likewise, flow path 44 in conjunction with valve 48 are operable to selectively allow anode effluent from second fuel cell stack 24 to flow to the anode side of first fuel cell stack 22, as described below.

A valve 50 is located in flow path 52 which is connected to anode outlet portion 38 of first fuel cell stack 22. Valve 50 is operable to selectively restrict and block flow through flow path 52. A valve 54 is located in flow path 56 which is connected to anode outlet portion 42 of second fuel cell stack 24. Valve 54 is operable to selectively restrict and block flow through flow path 56. Flow path 52 and valve 50 are operable to selectively vent anode effluent from fuel cell system 20, as described below. Likewise, flow path 56 and valve 54 are also operable to selectively vent anode effluent from fuel cell system 20, as described below. When venting anode effluent from fuel cell system 20, water and nitrogen will also be removed from fuel cell system 20. Thus, by venting anode effluent from fuel cell system 20 nitrogen and water can also be vented from the anode side of fuel cell system 20.

Fuel cell system 20, as shown in FIG. 1, allows first and second fuel cell stacks 22 and 24 to be operated in series such that anode reactant supplied to one of the fuel cell stacks can pass through the anode side of that fuel cell stack and then flow onward, as anode effluent, to the anode side of the other fuel cell stack via flow paths 40 and 44 which distributes nitrogen and water more homogeneously throughout fuel cell system 20 and reduces the amount of excess hydrogen vented from fuel cell system 20. This mechanization of fuel cell system 20 enables operation in two distinct operating modes, as described below.

A microprocessor (not shown) is employed to control the operation of fuel cell system 20. The microprocessor controls operation of the first and second gas injectors 26 and 28, valves 46 and 48, and valves 50 and 54. The microprocessor controls the individual operation of the valves to operate fuel cell system 20 in a desired mode, as discussed below.

In the first operating mode of fuel cell system 20, anode reactant is supplied to fuel cell system 20 and to the anode side of first fuel cell stack 22 by first gas injector 26 while second gas injector 28 is idle (not supplying anode reactant). Also in the first operating mode, valves 46 and 54 are open to allow flow therethrough while valves 48 and 50 are closed thereby blocking flow therethrough. Thus, in the first operating mode first gas injector 26 supplies anode reactant to the anode side of first fuel cell stack 22 via flow path 30. The anode reactant flows through the anode side of first fuel cell stack 22 wherein a portion of the anode reactant is consumed to produce electricity in first fuel cell stack 22. Hydrogen-containing anode effluent in first fuel cell stack 22 is routed to the anode side of second fuel cell stack 24 via flow path 40 through valve 46. A portion of the hydrogen-containing anode effluent supplied to the anode side of second fuel cell stack 24 is converted to electricity within second fuel cell stack 24. Anode effluent from second fuel cell stack 24 is routed via flow path 56 through valve 54 to a downstream component (not shown), such as a tail gas combustor. Thus, in the first operating mode, anode reactant flows through first fuel cell stack 22 and excess hydrogen exhausted by first fuel stack 22 in the anode effluent is supplied as an anode reactant to second fuel cell stack 24 wherein a portion of the remaining hydrogen is further consumed to produce additional electricity and the anode effluent produced by second fuel stack 24 is vented to a downstream component.

In the second operating mode of fuel cell system 20 second gas injector 28 provides anode reactant to the anode side of second fuel cell stack 24 via flow path 34 while first gas injector 26 is idle. Valves 48 and 50 are open to allow flow therethrough while valves 46 and 54 are closed thereby blocking flow therethrough. The second operating mode results in anode reactant being supplied to the anode side of second fuel cell stack 24 wherein a portion of the anode reactant is consumed to produce electricity. The hydrogen-containing anode effluent in second fuel cell stack 24 is routed to the anode side of first fuel cell stack 22 via flow path 44 through valve 48. First fuel cell stack 22 consumes a portion of the hydrogen-containing anode effluent from second fuel cell stack 24 to produce electricity. Anode effluent from first fuel cell stack 22 is routed via flow path 52 through valve 50 to a downstream component (not shown), such as a tail gas combustor. Thus, in the second operating mode, anode reactant flows through second fuel cell stack 24 and excess hydrogen exhausted by second fuel cell stack 24 in its anode effluent is supplied as an anode reactant to first fuel cell stack 22 wherein a portion of the remaining hydrogen is further consumed to produce additional electricity and the anode effluent produced by first fuel cell stack 22 is vented to a downstream component.

Operation of fuel cell system 20 is switched between the first and second modes. That is, fuel cell system 20 is operated in the first mode for a period of time and is then operated in the second mode for a period of time and switches back and forth between operating in the first and second modes. The duration of operation in the first and second modes will vary and can be based upon a variety of control scenarios. One control scenario can be based on comparing the current operating condition (load on the system) to empirical data and based on that empirical data switching operation between the first and second operating modes. The empirical data is established by operating fuel cell system 20 or an equivalent thereof on a test setup wherein the load on the fuel cell system is changed while other operating parameters of the system are monitored, such as the nitrogen level and nitrogen distribution, water level and water distribution, and cell voltages. The load on the fuel cell system is kept constant while the duration of operation in each operating mode is varied. Based on these observations optimal switching times (switching frequency) or ranges of times for switching between operating in the first and second modes are established that provide favorable operation of the fuel cell system, such as a substantially homogeneous distribution of nitrogen and/or water throughout fuel cell system 20 and a reduction in the amount of excess hydrogen vented from fuel cell system 20. The load on the fuel cell system is then adjusted and the frequency at which the fuel cell system is operated in each of the operating modes is again varied to obtain optimal switching times or range of switching times within which to switch between operating modes. The optimization of the switching times can be based on a variety of factors, such as obtaining a desired nitrogen distribution, water distribution, and/or cell voltage output. However, it should be understood that other operating parameters can be monitored and optimized in developing the empirical data and the associated switching times at which the fuel cell systems should be switched between operating modes.

A second control scenario on which operation of fuel cell system 20 can be operated involves using an algorithm that determines switching times and then switching modes of operation based on the algorithm. The algorithm determines a frequency at which operation of fuel cell system 20 should switch between the operating modes based on the load on the fuel cell system. The algorithm chosen is based upon providing a desired operation of fuel cell system 20, such as a desired nitrogen distribution, water distribution, and/or cell voltage output.

In one preferred scenario, each fuel cell stack 22 and 24 have the same amount of cells and the same active cell area and fuel cell system 20 is supplied anode reactant in a quantity sufficient to provide hydrogen to the first fuel cell stack encountered in a stoichiometric amount of at least 2.0. By providing a stoichiometric amount of at least 2.0, the anode effluent which is recycled should have a quantity of hydrogen sufficient to provide a stoichiometric amount in the second fuel cell stack encountered of 1.0 or higher. Alternatively, and/or additionally, the anode reactant can also be provided based on maintaining a desired pressure level in the anode side of the fuel cell system 20.

As described above, valves 54 and 50 are operated to provide for continuous venting of anode effluent from fuel cell system 20 when in the respective first and second operating modes. Preferably, valves 54 and 50 are operated to vent a controlled quantity of anode effluent from fuel cell system 20 so that a desired operation of fuel cell system 20 can be achieved. For example, valves 54 and 50 can be operated to maintain a pressure level in the anode side of fuel cell system 20 at a desired level and/or to maintain a desired flow rate through the anode side of fuel cell system 20. Alternatively, vent valves 54 and 50 can be operated in a normally closed mode and then selectively opened to vent anode reactant from fuel cell system 20. That is, the anode side of fuel cell system 20 is operated "deadheaded" such that anode effluent is usually not being vented from fuel cell system 20 regardless of the operating mode. Valve 54 and/or 50 are then opened, as desired, to vent anode effluent from fuel cell system 20. Such operation is referred to as "burping" the fuel cell system. When using valves 54 and 50 to burp fuel cell system 20, it should be appreciated that fuel cell system 20 can switch between first and second operating modes with no venting of anode effluent occurring each time fuel cell system 20 is operated in one of the modes. In other words, fuel cell system 20 may switch between operating in the first and second modes a number of times prior to the occurrence of any venting of anode effluent from fuel cell system 20. This type of operation helps distribute the nitrogen and water homogeneously throughout fuel cell system 20.

If first and second fuel cell stacks 22 and 24 are operated such that no liquid water is built up on the anode sides of the fuel cell stacks, one of the valves 50 and 54 can be eliminated from fuel cell system 20. That is, all the venting of anode effluent from fuel cell system 20 will occur through a single valve (either valve 50 or 54). This mechanization is advantageous in that it eliminates an additional valve from fuel cell system 20. Additionally, because substantially no liquid water is produced on the anode side of fuel cell system 20, the use of only a single valve to vent the anode effluent will not cause liquid water produced in the anode side of one of the fuel cell stacks to be routed through the anode side of the other fuel cell stack prior to being vented along with the anode effluent out of the fuel cell system. Thus, fuel cell system 20 can utilize a single valve in place of the two valves 50 and 54 shown and still be within the scope of the present invention. If liquid water is produced, water separators (not shown) can be employed in flow streams 40 and/or 44 to prevent liquid water from flowing from one fuel cell stack to another fuel cell stack, however, some of the advantages of the present invention may not be realized.

Figure 2:
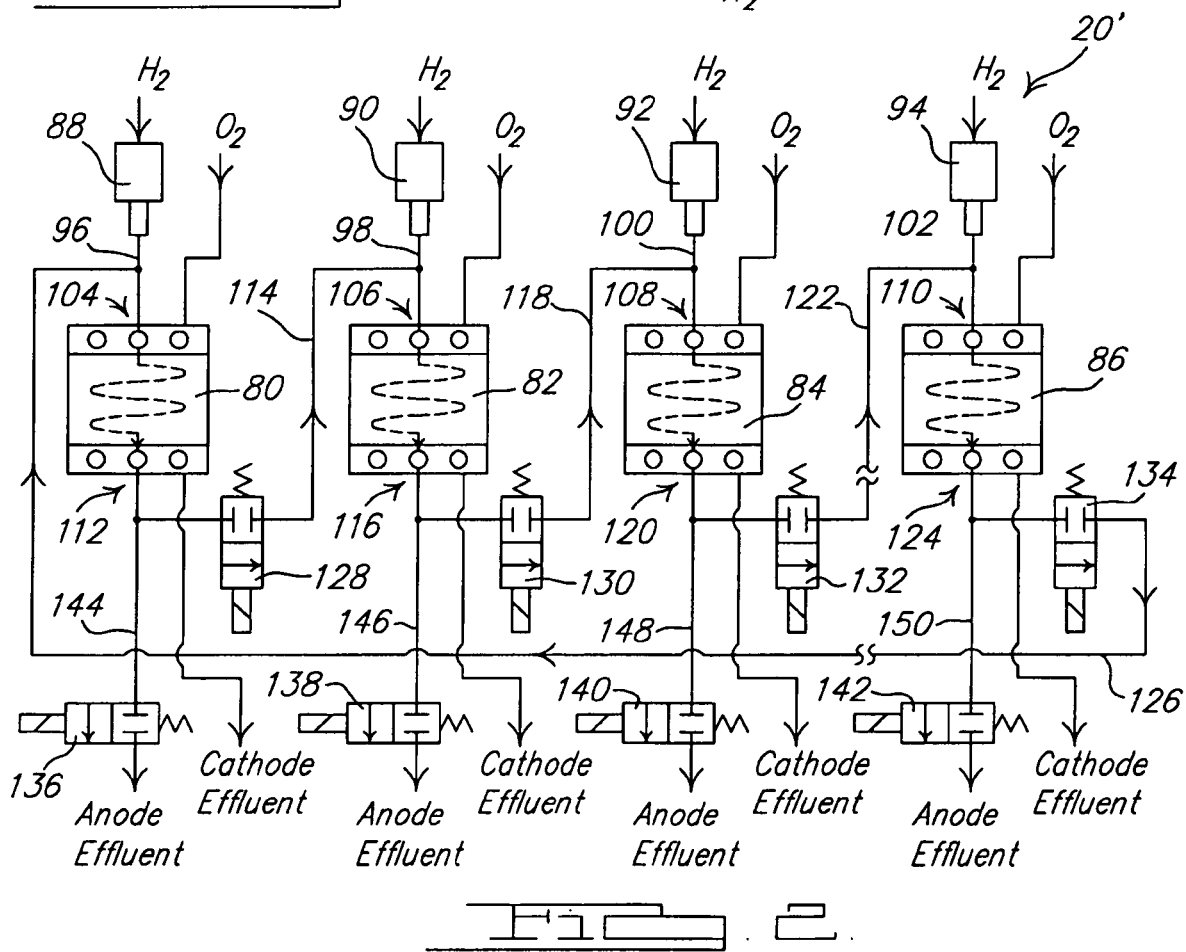
FIG. 2 is a schematic representation of a second preferred embodiment of a fuel cell system according to the principle of the present invention.

Referring now to FIG. 2, a second preferred embodiment of a fuel cell system 20' is shown. Fuel cell system 20' has a plurality of fuel cell stacks whose anode sides are linked together with flow paths such that anode effluent produced by one fuel cell stack can flow into an anode side of another fuel cell stack. Specifically, fuel cell system 20' includes a first fuel cell stack 80, a second fuel cell stack 82, a third fuel cell stack 84 on up to an $n^{th}$ fuel cell stack 86. There are first, second, third and $n^{th}$ anode reactant supply devices 88, 90, 92 and 94, in this case in the form of gas injectors. Flow paths 96, 98, 100 and 102 connect the respective gas injectors 88, 90, 92 and 94 to anode inlet portions 104, 106, 108 and 110 of the anode sides of the respective fuel cell stacks 80, 82, 84 and 86. The cathode sides of each of the fuel cell stacks 80, 82, 84 and 86 are provided with cathode reactant ($O_2$) which flows through the cathode sides of the fuel cell stacks as shown in FIG. 2. Each of the fuel cell stacks 80, 92, 84 and 86 are operable to use the anode and cathode reactants to produce electricity along with a hydrogen-containing anode effluent and an oxygen-containing cathode effluent. The supply of cathode reactant to the fuel cell stacks and the venting of cathode effluent produced in the fuel cell stacks will not be discussed further. It should be understood that cathode reactant will be supplied to the various fuel cell stacks and cathode effluent produced in the fuel cells stacks will be vented from the fuel cell system in quantities sufficient to meet the operational demands of the fuel cell system.

As stated above, anode effluent produced in the anode sides of each of the fuel cell stacks is routed to an anode inlet portion of another fuel cell stack such that the anode side of each fuel cell stack is capable of receiving anode effluent from a different fuel cell stack. Specifically, an anode outlet portion 112 of first fuel cell stack 80 is connected to anode inlet portion 106 of second fuel cell stack 82 with flow path 114. An anode outlet portion 116 of second fuel cell stack 82 is connected to the anode inlet portion 108 of third fuel cell stack 84 with flow path 118. An anode outlet portion 120 of third fuel cell stack 84 is connected to anode inlet portion 110 of $n^{th}$ fuel cell stack 86 with flow path 122. An anode outlet portion 124 of $n^{th}$ fuel cell stack 86 is connected to anode inlet portion 104 of first fuel cell stack 80 with flow path 126. Thus, the anode sides of the plurality of fuel cell stacks in fuel cell system 20' are all connected together in series by the flow paths. Valves 128, 130, 132 and 134 are positioned in the respective flow paths 114, 118, 122 and 126. Valves 128, 130, 132 and 134 are operable to selectively prevent flow through the respective flow paths 114, 118, 122 and 126.

Vent valves 136, 138, 140 and 142 are connected to anode outlet portions 112, 116, 120 and 124 of the respective fuel cell stacks 80, 82, 84 and 86 via flow paths 144, 146, 148 and 150. Vent valves 136, 138, 140 and 142 are operable to selectively vent anode effluent from fuel cell system 20' and from respective fuel cell stacks 80, 82, 84 and 86. Along with venting anode effluent from fuel cell system 20', vent valves 136, 138, 140 and 142 also vent nitrogen and/or water that has accumulated in the anode side of fuel cell system 20'.

A microprocessor (not shown) is employed to control the operation of gas injectors 88, 90, 92 and 94, valves 128, 130, 132 and 134, and vent valves 136, 138, 140 and 142. The microprocessor controls the individual operation of the valves to operate fuel cell system 20' in a desired mode, as discussed below.

The mechanization of fuel cell system 20' enables fuel cell system 20' to be operated in a number of different modes as will be apparent to those skilled in the art upon studying the figures and the associated description herein. One mode of operating fuel cell system 20' is in pairs wherein pairs of fuel cell stacks are operated in series and each pair is operated in parallel with the other pairs of the fuel cell system. As used herein and throughout the application, fuel cell stacks are in series when a hydrogen-containing stream supplied to one of the fuel cell stacks can pass through the anode side of that fuel cell stack and then flow onward, as anode effluent, to the anode side of the other fuel cell stack(s). Also as used herein and throughout the application, fuel cell stacks are in parallel when anode effluent produced in one fuel cell stack does not flow to the anode side of the other parallel arranged fuel cell stack(s). However, anode effluent from each of the parallel arranged fuel cell stacks may flow in series arrangement to other fuel cell stacks. The specific two fuel cell stacks which are operated as a pair can then be switched such that each fuel cell stack is paired with a different fuel cell stack at different times. For example, first and second fuel cell stacks 80 and 82 can operate as a pair of fuel cell stacks in series while third and $n^{th}$ fuel cell stacks 84 and 86 are operated as a pair of fuel cell stacks in series. To accomplish this, anode reactant is supplied by first gas injector 88 and third gas injector 92 to the anode sides of the respective first and third fuel cell stacks 80 and 84 while second and $n^{th}$ gas injectors 90 and 94 are idle. Valves 130 and 134 are closed along with vent valves 136 and 140 being closed.

Anode reactant flowing to first fuel cell stack 80 will then travel through the anode side of first fuel cell stack 80 wherein a portion of the hydrogen in the anode reactant is consumed to produce electricity. Anode effluent produced by first fuel cell stack 80 then flows to the anode side of second fuel cell stack 82 via flow path 114. Second fuel cell stack 82 then consumes a portion of the hydrogen contained in the anode effluent to produce electricity. Anode effluent produced in second fuel cell stack 82 can then be vented to a downstream component (not shown) via flow path 146 and vent valve 138. Similarly, anode reactant flowing to third fuel cell stack 84 will then travel through the anode side of third fuel cell stack 84 wherein a portion of the hydrogen in the anode reactant is consumed to produce electricity. Anode effluent produced by third fuel cell stack 84 then flows to the anode side of $n^{th}$ fuel cell stack 86 via flow path 122 and valve 132. $N^{th}$ fuel cell stack 86 then consumes a portion of the hydrogen in the anode effluent to produce electricity. Anode effluent produced in the $n^{th}$ fuel cell stack 86 can then be vented to a downstream component (not shown) via flow path 150 and vent valve 142.

After a period of time, the operation of fuel cell system 20' can then be switched such that each fuel cell stack is paired with a different fuel cell stack. For example, second and n$^{th}$ gas injectors 90 and 94 can be operated to provide anode reactant to second and n$^{th}$ fuel cell stacks 82 and 86 while the first and third gas injectors 88 and 92 are idle. Valves 132 and 128 are closed along with vent valves 138 and 142 being closed. In this operating mode, second and third fuel cell stacks 82 and 84 are operated in series while n$^{th}$ and first fuel cell stacks 86 and 80 are operated in series. Anode reactant flowing to the anode side of second fuel cell stack 82 is used to produce electricity while the anode effluent from second fuel cell stack 82 is routed to the anode side of third fuel cell stack 84 via flow path 118 and valve 130. The third fuel cell stack 84 then uses the anode effluent to produce electricity and the anode effluent produced by the third fuel cell stack 84 is vented to a downstream component (not shown) via flow path 148 and vent valve 140. Likewise, anode reactant supplied to the anode side of n$^{th}$ fuel cell stack 86 is used to produce electricity and the anode effluent produced in n$^{th}$ fuel cell stack 86 is routed to the anode side of first fuel cell stack 80 via flow path 126 and valve 134. First fuel cell stack 80 uses the anode effluent from n$^{th}$ fuel cell stack 86 to produce electricity. The anode effluent produced in first fuel cell stack 80 is vented to a downstream component (not shown) via flow path 144 and vent valve 136.

After a period of time operation of fuel cell system 20' will then be adjusted again such that the operation can revert back to the original mode of operation described above or continue to progress through the plurality of fuel cell stacks such that a different pair of fuel cell stacks are operated in series and in parallel other new pair(s) of fuel cell stacks that are being operated in series. Additionally, depending upon the number of fuel cell stacks in fuel cell system 20', the various valves in fuel cell system 20' can be adjusted to operate more than two fuel cell stacks in series. For example, first second and third fuel cell stacks 80, 82 and 84 can be operated in series with anode reactant supplied to first fuel cell stack 80, the anode effluent from first fuel cell stack 80 routed to the anode side of second fuel cell stack 82 and the anode effluent from second fuel cell stack 82 routed to the anode side of third fuel stack 84. These three fuel cell stacks can then be operated in parallel with other groupings of fuel cell stacks, as desired. Another possibility is to operate all of the fuel cell stacks in fuel cell system 20' in series with one another with the vent valve associated with the last fuel cell stack of the series open and the flow path from the last fuel cell stack of the series to the first fuel cell stack in the series closed. The gas injector being operated can them be varied along with varying the flow path valve that is closed and the vent valve that is open and cycling through the various fuel cell stacks either in sequence or in alternating fashion, as desired.

Thus, it should be apparent that fuel cell system 20' can be operated in a large number of configurations and permutations. The various permutations and operating modes can be coordinated to provide a desired operation of fuel cell system 20'. For example, the operation can be configured and adjusted to provide for a substantially even nitrogen distribution or water distribution throughout the fuel cell system such that concentrations of one or both of these is minimized. The operation can also be adjusted to provide adequate humidification to all of the fuel cell stacks so that none of the fuel cell stacks are run in a dry or with a low relative humidity and degradation of the performance of the fuel cell stack is avoided. Further, if one or more of the fuel cell stacks is malfunctioning, the appropriate valves can be closed to isolate the malfunctioning fuel cell stack(s) and the fuel cell system operated without the malfunctioning fuel cell stack(s).

The operation of fuel cell system 20' and the switching between the various modes can be based on a number of control schemes. For example, as is mentioned above with reference to the fuel cell system 20, empirical data can be gathered based on testing fuel cell system 20' or a similar fuel cell system. Based on the empirical data gathered, performance of the fuel cell system to optimize various operating features, such as nitrogen build-up or distribution, water build-up or distribution, and cell voltage, can be achieved. The current operating condition, such as load on fuel cell system 20' can be compared to the empirical data and the appropriate operating mode and frequency of switching modes can then be accomplished. Alternatively, an algorithm can be employed such that the microprocessor enters the current operating requirements of fuel cell system 20' and the appropriate mode and frequency of switching modes is provided by the algorithm.

Fuel cell system 20' can be operated with at least one of the vent valves 136, 138, 140 and 142 open to allow a continuous flow of anode effluent from fuel cell system 20' or, in the alternative, can be operated with all the vent valves 136, 138, 140 and 142 normally closed and periodically venting (burping) anode effluent from the fuel cell system 20' to purge nitrogen or water that has built-up in fuel cell system 20'. Gas injectors 88, 90, 92 and 94 can be operated to provide a desired stoichiometric amount of anode reactant to the various fuel cell stacks, and/or to maintain a desired pressure level on the anode side of fuel cell system 20'. Likewise, vent valves 136, 138, 140 and 142 can also be operated to maintain a desired pressure on the anode side of fuel cell system 20'.

Figure 3:
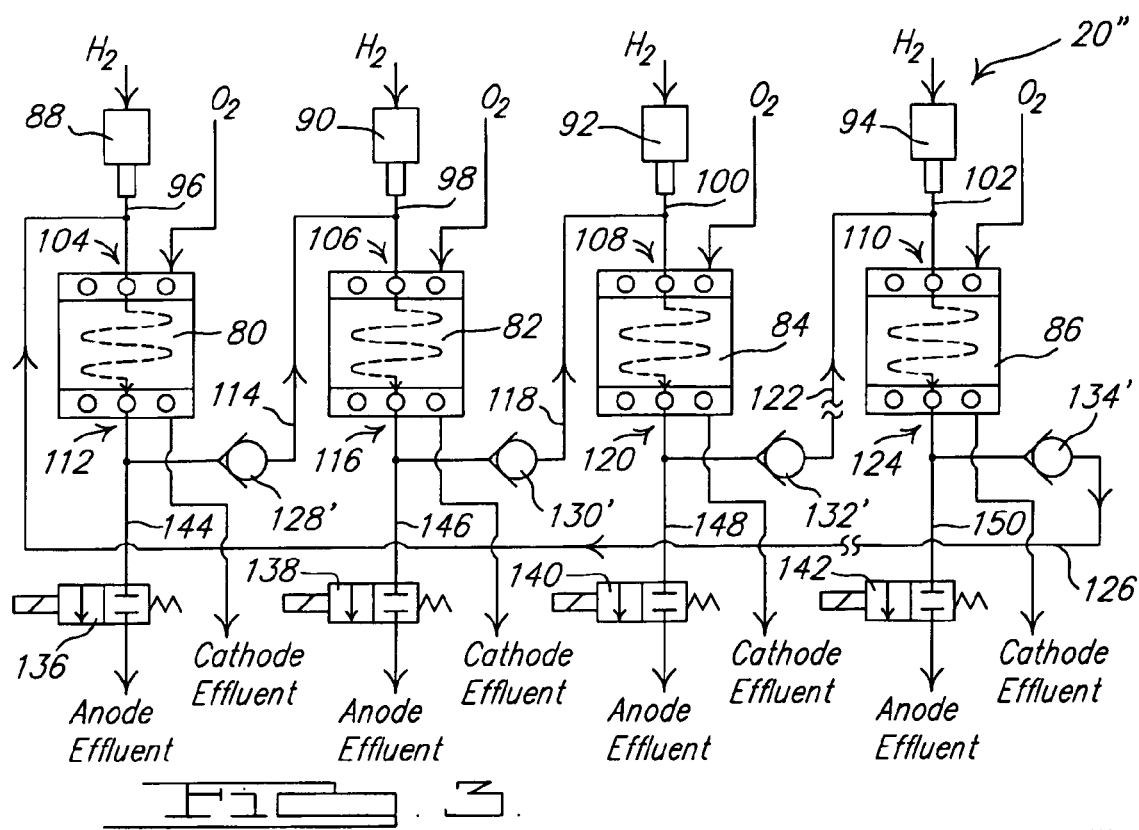
FIG. 3 is a first alternate embodiment of the fuel cell system of FIG. 2 with check valves in the flow paths between the fuel cell stacks.

Referring now to FIG. 3, a first alternate embodiment of fuel cell system 20' is shown and indicated as fuel cell system 20". Fuel cell system 20" is schematically identical to fuel cell system 20', shown in FIG. 2, with one difference. The one difference is that valves 128, 130, 132 and 134 of FIG. 2 are check valves in fuel cell system 20" as shown in FIG. 3. Check valves 128', 130', 142' and 143' limit flow through the respective flow paths 114, 118, 122 and 126 to a singe direction. Check valves 128', 130', 132' and 134' are oriented so that flow through the respective flow paths 114, 118, 122 and 126 goes from an anode outlet portion of a fuel cell stack to an anode inlet portion of the connected fuel cell stack.

The modes of operation of fuel cell system 20" (FIG. 3) are more limited than those of fuel cell system 20' (FIG. 2) discussed above. Specifically, because valves 128', 130', 132' and 134' are check valves, these valves cannot be operated to prevent flow through flow paths 114, 118, 122 and 126. Thus, all the fuel cell stacks that comprise fuel cell system 20" are operated in series and cannot be grouped into pairs that are operated in parallel with other pairs of fuel cell stacks as is possible with fuel cell system 20'. Additionally, because of the use of check valves, anode reactant and/or anode effluent flowing through the anode side of fuel cell system 20" is a continuous loop that is not physically prevented. A portion of the anode effluent flowing through the anode sides of fuel cell system 20" can, however, be vented from fuel cell system 20" via one or more of the vent valves 136, 138, 140 and 142. Thus, a portion of the anode effluent flowing through fuel cell system 20" can be vented via the vent valves.

Fuel cell system 20" can be operated in a variety of modes. For example, one mode of operation is providing anode reactant via one of the gas injectors 88, 90, 92 and 94 and varying which gas injector is used to provide anode reactant to one of the fuel cell stacks. By altering which injector is used to supply anode reactant to fuel cell system 20″, nitrogen and water distribution throughout fuel cell system 20″ can be controlled and possibly distributed substantially evenly throughout the entire fuel cell system 20″. Fuel system 20″ can also be operated with two or more gas injectors supplying anode reactant to fuel cell system 20″. The two or more gas injectors that are used to route anode reactant to the fuel cell system 20″ can then be altered to provide desired operation of fuel cell system 20″. Thus, fuel cell system 20″ can be operated in a variety of modes to obtain a desired operation of fuel cell system 20″ but has less variability in operation than that of fuel cell system 20′ discussed above.

Figure 4:
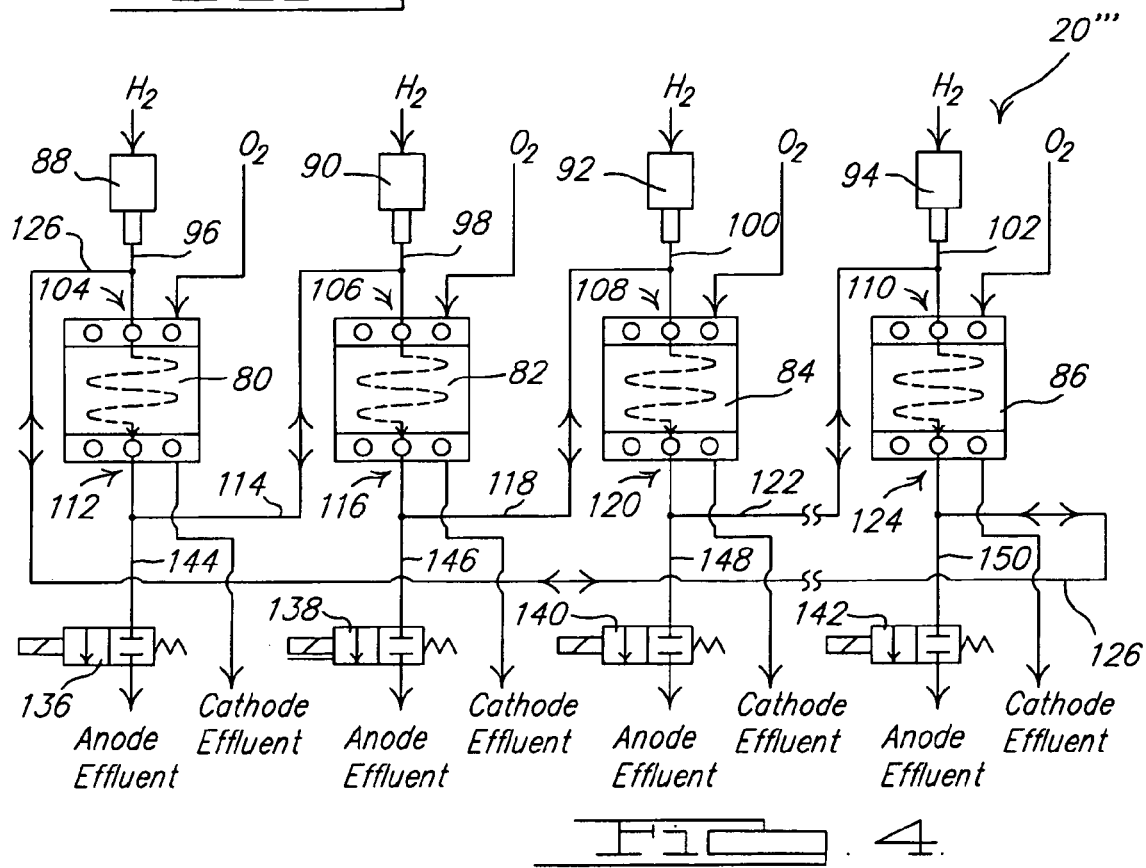
FIG. 4 is a second alternate embodiment of the fuel cell system of FIG. 2 with no valves in the flow paths between the fuel cell stacks.

Referring now to FIG. 4, a second alternate embodiment of fuel cell system 20′ is disclosed and identified as fuel cell system 20′″. Fuel cell system 20′″ is substantially the same as fuel cell system 20′ shown in FIG. 2 with the removal of valves 128, 130, 132 and 134 from flow paths 114, 118, 122 and 126. The removal of these valves from the flow paths allows flow through flow paths 114, 118, 122 and 126 to flow in either direction between the connected fuel cell stacks and does not allow flow through the flow paths to be prevented. The direction of flow within flow paths 114, 118, 122 and 126 will depend upon which and how many gas injectors 88, 90, 92 and 94 are supplying anode reactant to fuel cell system 20′″, the quantity of anode reactant being supplied by each of the gas injectors and the physical layout of the flow paths. In other words, anode reactant supplied by gas injectors 88, 90, 92 and 94 will flow toward the respective fuel cell stack 80, 82, 84 and 86 and will also flow through the flow paths connecting the individual fuel cells (in either direction) following the path of least resistance and exiting fuel cell system 20′″ via the one or more open vent valves 136, 138, 140 and 142 when being operated with continuous venting of anode effluent. When the fuel cell system 20′″ is operated without continuous venting of anode effluent (burping operation), the anode reactant will flow through the fuel cell stacks and through the flow paths connecting the individual fuel cells (in either direction) until resistance is met by encountering flow introduced into fuel cell system 20′″ from the same or a different gas injector, as described below. The burping operation results in a "dead spot" in the flow of anode reactant in the flow path connecting the fuel cell stacks of fuel cell system 20′″. The "dead spot" represents the location at which anode reactant flow from one injector encounters anode reactant flow from the same or another injector and a pressure balance of the two flows occurs. The location of the "dead spot" will vary depending upon which gas injector(s) are used to provide anode reactant to fuel cell system 20′″ and the piping configuration or restrictions in the anode reactant flows. The "dead spot" can be moved in either direction by unbalancing the flow through the injectors.

Fuel cell system 20′″, as stated above with reference to the other fuel cell systems, is preferably operated while continuously venting a portion of the anode effluent produced in fuel cell system 20′″. Alternatively, fuel cell system 20′″ can be operated in a burping mode wherein anode effluent is not continuously vented from fuel cell system 20′″, but rather is vented periodically as desired via one of the vent valves as described below.

When operating fuel cell system 20′″ with continuous venting, a number of different operating modes are available as will be apparent to one skilled in the art upon studying the drawings and the following description of operation. A preferred method of operating fuel cell system 20′″ involves supplying anode reactant via one of the gas injectors 88, 90, 92 and 94 and continuously venting a portion of the anode effluent produced in fuel cell system 20′″ through one of the vent valves 136, 138, 140 and 142. After a period of time, the gas injector which is supplying the anode reactant is switched and the vent valve that is venting a portion of the anode effluent is also switched. Cycling through each of the gas injectors and each of the vent valves can then occur at desired time intervals to provide for generally uniform water and nitrogen distribution throughout fuel cell system 20′″. For example, in a first mode, fuel cell system 20′″ is supplied with anode reactant by first gas injector 88 while the remaining gas injectors are idle. The anode reactant supplied by first gas injector 88 is split into two portions. A first portion of the anode reactant supplied by gas injector 88 flows into the anode side of first fuel cell stack 80 via flow path 96. First fuel cell stack 80 consumes a portion of the anode reactant to produce electricity. Anode effluent produced in first fuel cell stack 80 flows to the anode side of second fuel cell stack 82 via flow path 114. Second fuel cell stack 82 consumes a portion of the hydrogen in the anode effluent to produce electricity. Likewise, anode effluent produced in second fuel cell stack 82 will flow toward the anode side of third fuel cell stack 84 via flow path 118. However, there will also be anode effluent flowing from the anode side of third fuel cell stack 84 (as a result of the second portion of the anode reactant supplied by first gas injector 88) toward the anode side of second fuel cell stack 82 via flow path 118, as discussed below. A second portion of the anode reactant supplied by gas injector 88 flows to $n^{th}$ fuel cell stack 86 via flow path 126. Because there are no valves in the flow paths interconnecting the various fuel cell stacks, the second portion of anode reactant flows through $n^{th}$ fuel cell stack 86 in a reverse direction (from an outlet portion to an inlet portion). $N^{th}$ fuel cell stack 86 consumes a portion of the hydrogen in the anode reactant to produce electricity. Anode effluent produced in $n^{th}$ fuel cell stack 86 flows from anode inlet portion 110 to the anode side of third fuel cell stack 84 through the anode outlet portion 120 via flow path 122. Third fuel cell stack 84 consumes a portion of the hydrogen in the anode effluent to produce electricity. The anode effluent produced by third fuel cell stack 84 flows toward the anode side of second fuel cell stack 82 via flow path 118. Because flow path 118 is the path within which the first and second portions of anode reactant supplied by gas injector 88 meet, vent valve 138 is operated to vent a portion of the anode effluent produced in fuel cell system 20′″. Thus, anode effluent produced by second and third fuel cell stacks 82 and 84 are vented out of fuel cell system 20′″ via vent valve 138 and flow path 146.

This mode of operation results in two pairs of fuel cell stacks being operated in series (first and second fuel cell stacks 80 and 82, and third and $n^{th}$ fuel cell stacks 84 and 86) and the two pairs being operated in parallel to produce electricity. After a period of time, operation of fuel cell system 20′″ is switched to a different mode wherein a different gas injector supplies anode reactant to fuel cell system 20′″ and a different vent valve is operated to continuously vent a portion of anode effluent from fuel cell system 20′″. For example, second gas injector 90 can be operated to provide anode reactant to fuel cell system 20′″ while first, third and $n^{th}$ gas injectors 88, 92 and 94 are idle. Vent valve 140 is then operated to provide continuous venting of a portion of the anode effluent produced by fuel cell system 20′″. This mode results in a portion of the anode reactant supplied by second gas injector 90 to flow through the anode side of second fuel cell stack 82 and a different portion of the anode reactant to flow through the anode side of first fuel cell stack 80 in a reverse direction, via flow path 114. Anode effluent produced in second fuel cell stack 84 flows through the anode side of third cell stack 84 via flow path 118 while anode effluent produced in first fuel cell stack 80 flows through the anode side of $n^{th}$ fuel cell stack 86 in a reverse direction via flow path 126. Anode effluent produced in $n^{th}$ fuel cell stack 86 then flows via flow path 122 and 148 out vent valve 140 to a downstream component. Anode effluent produced in third fuel cell stack 84 also flows via flow path 148 through vent valve 140 to a downstream component. Thus, in this mode of operation two pairs of fuel cell stacks are operated in series (second and third fuel cell stacks 82 and 84 and first and $n^{th}$ fuel cell stacks 80 and 86) which are operating in parallel with one another.

After a desired amount of time, operation of fuel cell system 20''' can again be adjusted so that a different gas injector is used to supply anode reactant and a different vent valve is used to continuous vent a portion of the anode effluent produced in fuel cell system 20'''. For example, third gas injector 92 can be operated to provide anode reactant to fuel cell system 20''' while vent valve 142 is operated to vent a portion of the anode effluent from fuel cell system 20'''. This operation results in third and $n^{th}$ fuel cell stacks 84 and 86 being operated in series while second and first fuel cell stacks 82 and 80 are operated in series. The two pairs of series operated fuel cell stacks are operated in parallel with one another with a portion of the anode effluent produced by the two pair of fuel cell stacks venting through vent valve 142. Finally, after a desired amount of time operation of fuel cell system 20''' can then be switched to provide anode reactant via $n^{th}$ gas injector 94 and venting a portion of the anode effluent produced by fuel cell system 20''' through vent valve 136. This mode results in $n^{th}$ and first fuel cell stacks 86 and 80 being operated in series while third and second fuel cell stacks 84 and 82 are operated in series. The two pairs of fuel cell stacks are operated in parallel and a portion of the anode effluent produced by fuel cell system 20''' is continuously vented by vent valve 136.

Fuel cell system 20''', as stated above, can also be operated in a burping mode. During the burping mode, anode effluent produced by fuel cell system 20''' is not continuously vented from the system, rather, the anode effluent is periodically burped to purge built-up nitrogen and/or water.

In the burping mode, fuel cell system 20''' can also be operated in a variety of ways. One method of operation is to supply anode reactant by every other gas injector, then supplying anode reactant by the previously idle gas injectors and then switching back and forth between the two modes of operation. For example, anode reactant can be supplied by gas injectors 88 and 92 while gas injectors 90 and 94 are idle. A portion of the anode reactant supplied by gas injector 88 will flow to the anode side of first fuel cell stack 80 via flow path 96 wherein a portion of the hydrogen is consumed to produce electricity. Anode effluent produced in first fuel cell stack 80 flows toward the anode side of second fuel cell stack 82 via path 114. However, the anode effluent from first fuel cell stack 80 in flow path 114 will meet resistance from anode effluent produced in second fuel cell stack 82 as a result of anode reactant being injected into fuel cell system 20''' by gas injector 92 and result in a dead spot as described below. A different portion of the anode reactant supplied by gas injector 88 flows to the anode side of $n^{th}$ fuel cell stack 86 via flow path 126. Anode reactant supplied to $n^{th}$ fuel cell stack 86 by first gas injector 88 will flow through $n^{th}$ fuel cell stack 86 in a reverse fashion such that the anode reactant flows in the anode outlet portion 124 of $n^{th}$ fuel cell stack 86. $N^{th}$ fuel cells tack 86 consumes a portion of the hydrogen to produce electricity and anode effluent produced in $n^{th}$ fuel cell stack 86 flows toward third fuel cell stack 84 via flow path 122. However, anode effluent from $n^{th}$ fuel cell stack 86 will encounter resistance from anode effluent produced in third fuel cell stack 84 in flow path 122 and results in a dead spot, as described below.

Similarly, a portion of the anode reactant supplied by third gas injector 92 will flow to the anode side of third fuel cell stack 84 via flow path 100 wherein a portion of the hydrogen is consumed to produce electricity. Anode reactant produced in third fuel cell stack 84, as stated above, then flows toward $n^{th}$ fuel cell stack 86 via flow path 122. However, anode effluent produced in $n^{th}$ fuel cell stack 86 is also flowing in flow path 122 in an opposite direction and encounters the anode effluent produced by third fuel cell stack 84. The flow of the anode effluents from the third and $n^{th}$ fuel cell stacks 84 and 86 toward one another results in a dead spot occurring in flow path 122. A different portion of the anode reactant supplied by third gas injector 92 flows to the anode side of second fuel cell stack 82 via flow path 118 wherein a portion of the hydrogen is consumed to produce electricity. Anode effluent produced in second fuel cell stack 82 is exhausted out of anode inlet portion 106 and flows toward first fuel cell stack 80 via flow path 114. However, as stated above, anode effluent produced in first fuel cell stack 80 also flows in flow path 114 toward second fuel cell stack 82. Thus, the anode effluents produced by first and second fuel cell stacks 80 and 82 travel toward one another and results in a dead spot occurring in flow path 114. To prevent drying out or dehumidification of a portion of one of the fuel cell stacks, and to promote generally uniform nitrogen and water distribution, fuel cell system 20''' can then be operated in an alternate mode wherein gas injectors 90 and 94 provide anode reactant to the fuel cell system 20''' while gas injectors 88 and 92 are idle. As will be appreciated, dead spots on the anode side of fuel cell system 20''' will now occur in flow paths 118 and 126. Operation of fuel cell system 20''' can then be alternated between these two operating modes to provide a desired operation and to promote uniform nitrogen and water distribution throughout fuel cell system 20'''.

Anode effluent produced in fuel cell system 20''' is then periodically vented or burped from the fuel cell system as desired. That is, one or more of the vent valves 136, 138, 140 and 142 are opened to vent a portion of the anode effluent produced by fuel cell system 20'''. Preferably, the vent valves that are open correspond to the dead spots that have occurred in fuel cell system 20'''. That is, when a dead spot occurs in flow path 114, it is preferred that vent valve 136 be used to vent anode effluent from fuel cell system 20'''. Likewise, when the dead spot occurs in flow paths 118, 122 and/or 126, it is preferred that anode effluent be vented from the fuel cell system 20''' through vent valves 138, 140 and/or 142, respectively. Thus, anode effluent is selectively burped or vented from fuel cell system 20''' via one or more of the vent valves 136, 138, 140 and 142. It should be appreciated that operation of fuel cell system 20''' can be switched between the various modes disclosed while venting or burping of anode effluent is performed as desired and not necessarily vented or burped during each different mode of operation.

Varying the operation of fuel cell system 20''' between which gas injector supplies anode reactant and which vent valve vents a portion of the anode effluent distributes the nitrogen and water throughout the anode side of fuel cell system 20'''. Preferably, the intervals at which the various modes are switched between results in a substantially uniform nitrogen distribution and water distribution throughout fuel cell system 20'''. As is stated above with reference to fuel cell systems 20, 20' and 20'', the intervals at which operation of fuel cell system 20''' is switched between various modes can be based on a variety of factors. For example, the operation of fuel cell system 20''' can be compared to empirical data to determine the appropriate frequency at which to switch operations, or an algorithm can be employed to determine the frequency at which the fuel cell system 20''' should be switched between the various modes.

Thus, fuel cell system 20''' provides for operation of pairs of fuel cell stacks in series which are operated in parallel with other pairs of fuel cell stacks operated in series. Fuel cell system 20''' also provides for flow through the anode side of the fuel cell stacks in either direction. These flow patterns result in a good distribution of nitrogen and water throughout fuel cell system 20''' and can result in an increased performance of the fuel cell system.

While the present invention has been described by reference to specific examples shown in the figures and identified as fuel cell systems 20, 20', 20'' and 20''', it should be appreciated that variations can be made in the configuration and operation of the various fuel cell systems without departing from the scope of the invention. For example, while the various fuel cell stacks have been shown and described as being individual fuel cell stacks, it should be appreciated that the fuel cell stacks can comprise a single fuel cell stack that is divided or partitioned into separate zones or regions such that the anode sides are separated and form individual discrete anode flow paths through which anode reactant and/or anode effluent can flow and electricity production can occur. Additionally, the valves (that can be opened and closed) in the flow paths are preferably simple on/off valves that are operable to allow/block flow through the various flow paths due to the low cost and low complexity, however, the valves could also be regulators or adjustable valves (proportional valves) that can control the quantity of flow through the various flow paths and still be within the scope of the present invention. The use of regulators or adjustable valves (proportional valves) allow for smooth transitions from one operating mode to the next and may reduce pressure transients on the fuel cell stacks. Additionally, while gas injectors are shown as being used to supply anode reactant to the fuel cell systems other means of supplying anode reactant to the fuel cell systems can be employed. Moreover, if liquid water is produced by the fuel cell stacks it should be appreciated that separators could be positioned in the flow paths connecting the anode sides of the fuel cell stacks together to prevent liquid water from flowing from the anode side of one fuel cell stack to the anode side of another fuel cell stack without departing from the scope of the present invention Further, while the anode effluent vented from the fuel cell systems has been described as being provided to a downstream component, it should be appreciated that the anode effluent, dependent upon the hydrogen content may be vented to the atmosphere and still be with in the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a fuel cell system having a plurality of fuel cell stacks each operable to convert a hydrogen-containing anode reactant on an anode side of the fuel cell stack and an oxidant-containing cathode reactant on a cathode side of the fuel cell stack into electricity, a hydrogen-containing anode effluent on the anode side and an oxidant-containing cathode effluent on the cathode side, wherein the anode side of each fuel cell stack is connected to the anode side of a different one of the fuel cell stacks with individual discrete flow paths, the method comprising:
    (a) supplying a hydrogen-containing anode reactant stream to an anode side of at least one fuel cell stack of the plurality of fuel cell stacks for reaction therein and production of a first anode effluent stream;
    (b) supplying said first anode effluent stream to the anode side of at least one of the other fuel cell stacks of the plurality of fuel cell stacks via at least one of the individual discrete flow paths for reaction therein and production of a second anode effluent stream;
    (c) switching which fuel cell stack(s) receives said anode reactant stream; and
    (d) selectively venting a portion of anode effluent from the fuel cell system, said vented portion including nitrogen.

2. The method of claim 1, wherein selectively venting a portion of anode effluent includes selectively venting said portion of anode effluent from a same number of fuel cell stacks as a number of fuel cell stacks receiving said anode reactant stream while said fuel cell stacks are receiving said anode reactant stream.

3. A method of operating a fuel cell system having a plurality of fuel cell stacks each operable to convert a hydrogen-containing anode reactant on an anode side of the fuel cell stack and an oxidant-containing cathode reactant on a cathode side of the fuel cell stack into electricity, a hydrogen-containing anode effluent on the anode side and an oxidant-containing cathode effluent on the cathode side, wherein the anode side of each fuel cell stack is connected to the anode side of a different fuel cell stack with a flow path, the method comprising:
    (a) supplying a hydrogen-containing anode reactant stream to an anode side of at least one fuel cell stack of the plurality of fuel cell stacks for reaction therein and production of a first anode effluent stream;
    (b) supplying said first anode effluent stream to the anode side of at least one of the other fuel cell stacks of the plurality of fuel cell stacks via the flow paths for reaction therein and production of a second anode effluent stream;
    (c) switching which fuel cell stack(s) receives said anode reactant stream; and
    (d) selectively venting a portion of anode effluent from a fuel cell stack other than said at least one fuel cell stack receiving said anode reactant stream while said at least one fuel cell stack is receiving said anode reactant stream, said vented portion including nitrogen.

4. The method of claim 1, further comprising blocking flow through at least one of the flow paths.

5. The method of claim 4, further comprising switching which at least one flow path is blocked when said fuel cell stack(s) that receives said anode reactant stream is switched.

6. The method of claim 1, further comprising comparing an operating condition of the fuel cell system with empirical data and wherein switching which fuel cell stack(s) that receive said anode reactant stream is based on said comparison.

7. The method of claim 1, wherein switching which fuel cell stack(s) that receive said anode reactant stream is based on an algorithm.

8. A method of operating a fuel cell system having a plurality of fuel cell stacks each operable to convert a hydrogen-containing anode reactant on an anode side of the fuel cell stack and an oxidant-containing cathode reactant on a cathode side of the fuel cell stack into electricity, a hydrogen-containing anode effluent on the anode side and an oxidant-containing cathode effluent on the cathode side, wherein the anode side of each fuel cell stack is connected to the anode side of a different fuel cell stack with a flow path, the method comprising:
(a) supplying a hydrogen-containing anode reactant stream to an anode side of at least one fuel cell stack of the plurality of fuel cell stacks for reaction therein and production of a first anode effluent stream;
(b) supplying said first anode effluent stream to the anode side of at least one of the other fuel cell stacks of the plurality of fuel cell stacks via the flow paths for reaction therein and production of a second anode effluent stream; and
(c) switching which fuel cell stack(s) receives said anode reactant stream at a frequency of at least an order of magnitude faster than a nitrogen buildup time in the fuel cell system.

9. The method of claim 1, further comprising continuously venting said portion of anode effluent produced by the fuel cell system.

10. The method of claim 1, wherein supplying an anode reactant stream to an anode side of at least one fuel cell stack includes supplying an anode reactant stream to the anode sides of only one half of the plurality of fuel cell stacks and switching which fuel cell stack(s) receives said anode reactant stream includes switching to supplying said anode reactant stream to the anode sides of only the other half of the plurality of fuel cell stacks and further comprising varying which fuel cell stacks are included in each half.

11. The method of claim 1, further comprising limiting a direction of flow through the flow paths to a single direction with a directional flow limiting device in the flow paths.

12. A method of operating a fuel cell system having a plurality of fuel cell stacks each operable to convert a hydrogen-containing anode reactant on an anode side of the fuel cell stack and an oxidant-containing cathode reactant on a cathode side of the fuel cell stack into electricity, a hydrogen-containing anode effluent on the anode side and an oxidant-containing cathode effluent on the cathode side, wherein the anode side of each fuel cell stack is connected to the anode side of a different fuel cell stack with a flow path, the method comprising:
(a) supplying a hydrogen-containing anode reactant stream to an anode side of at least one fuel cell stack of the plurality of fuel cell stacks for reaction therein and production of a first anode effluent stream;
(b) supplying said first anode effluent stream to the anode side of at least one of the other fuel cell stacks of the plurality of fuel cell stacks via the flow paths for reaction therein and production of a second anode effluent stream;
(c) switching which fuel cell stack(s) receives said anode reactant stream; and
(d) selectively venting a portion of anode effluent from the fuel cell system, said vented portion including nitrogen, wherein the plurality of fuel cell stacks is at least three fuel cell stacks and said first anode effluent stream is supplied in series to the anode sides of all of the other fuel cell stacks of the plurality of fuel cell stacks via the flow paths for reaction therein and production of said second anode effluent stream.

13. The method of claim 1, further comprising switching which fuel cell stack(s) of the other fuel cell stacks that receive said first anode effluent stream.

14. A method of operating a fuel cell system having at least three fuel cell stacks each operable to convert a hydrogen-containing anode reactant on an anode side of the fuel cell stack and an oxidant-containing cathode reactant on a cathode side of the fuel cell stack into electricity, a hydrogen-containing anode effluent on the anode side and an oxidant-containing cathode effluent on the cathode side, the method comprising:
(a) supplying a hydrogen-containing anode reactant stream to the anode sides of each fuel cell stack in a first segment of the system for reaction therein to produce at least one first segment anode effluent stream, wherein said first segment comprises one or more fuel cell stacks of the at least three fuel cell stacks;
(b) supplying said at least one first segment anode effluent stream to the anode sides of fuel cell stacks in a second segment of the system for reaction therein to produce at least one second segment anode effluent stream, wherein said second segment comprises the remaining fuel cell stacks of the at least three fuel cell stacks; and
(c) changing a selection of said one or more fuel cell stacks that comprise said first segment.

15. The method of claim 14, further comprising selectively venting a portion of anode effluent from the fuel cell system, said vented portion including nitrogen.

16. The method of claim 15, wherein selectively venting a portion of anode effluent includes selectively venting said portion of anode effluent from a same number of second segment fuel cell stacks as a number of fuel cell stacks that comprise said first segment.

17. The method of claim 16, wherein selectively venting a portion of anode effluent includes selectively venting a portion of said second segment anode effluent.

18. The method of claim 14, wherein said first segment contains a plurality of fuel cell stacks that produce a plurality of first segment anode effluent streams and further comprising supplying each first segment anode effluent stream to a different fuel cell stack of said second segment such that each first segment fuel cell stack is operating in series with a different second segment fuel cell stack.

19. The method of claim 14, further comprising comparing an operating condition of the fuel cell system with empirical data and wherein changing a selection of said one or more fuel cell stacks that comprise said first segment is based on said comparison.

20. The method of claim 14, wherein changing a selection of said one or more fuel cell stacks that comprise said first segment is based on an algorithm.

21. The method of claim 14, wherein changing a selection of said one or more fuel cell stacks that comprise said first segment is done at a frequency of at least an order of magnitude faster than a nitrogen buildup time in the fuel cell system.

22. The method of claim 14, further comprising continuously venting a portion of anode effluent produced by the fuel cell system.

23. The method of claim 1, wherein said switching includes changing which fuel cell stacks are operating in series with one another.

24. The method of claim 23, wherein said switching includes changing which fuel cell stacks are operating in parallel with one another.

25. The method of claim 14, wherein a first group of at least one fuel cell stack in each of said first and second segments operating in series operates in parallel with a second group of a different at least one fuel cell stack in each of said first and second segments operating in series.

26. The method of claim 25, further comprising changing which fuel cell stacks are in said first and second groups.

27. The method of claim 14, wherein (a) includes supplying said hydrogen-containing anode reactant in a quantity sufficient to provide a stoichiometric quantity of hydrogen of at least 1.0 to at least one of said second segment fuel cell stacks.

* * * * *